United States Patent [19]

Mariel

[11] Patent Number: 4,575,968
[45] Date of Patent: Mar. 18, 1986

[54] VEHICLE DOOR ASSEMBLY

[75] Inventor: James G. Mariel, Mishawaka, Ind.

[73] Assignee: Excel Industries, Inc., Elkhart, Ind.

[21] Appl. No.: 550,785

[22] Filed: Nov. 14, 1983

[51] Int. Cl.$^4$ ............................................. B60J 5/04
[52] U.S. Cl. ..................................... 49/502; 296/146
[58] Field of Search .................. 49/502, 505; 296/146; 52/212

[56] References Cited

U.S. PATENT DOCUMENTS 3,370,384  2/1968  Hafer et al. .......................... 49/502
4,405,173  9/1983  Piano .................................. 296/146

FOREIGN PATENT DOCUMENTS 2539363  3/1976  Fed. Rep. of Germany ........ 52/212

Primary Examiner—Kenneth Downey
Attorney, Agent, or Firm—James D. Hall

[57] ABSTRACT

A door assembly for installation in a vehicle wall opening which includes a frame and a door hingedly mounted in the frame. The frame is divided into first and second sections. Each section has a flange which abuts the vehicle wall when the sections are connected to mount the door in the vehicle wall opening. Each frame section flange carries a seal which makes sealing contact with the vehicle wall, and the door carries a continuous, peripheral seal which makes sealing contact with the frame when the door is in a closed position to prevent moisture from entering the vehicle.

5 Claims, 5 Drawing Figures

VEHICLE DOOR ASSEMBLY

SUMMARY OF THE INVENTION

This invention relates to a door assembly for installation in a vehicle wall opening.

The door assembly of this invention includes a door which is hinge mounted to a door assembly frame. The door includes a panel which is shaped to fit within the door assembly frame. The door assembly frame includes inner and outer sections each of which includes a flange. The door assembly frame sections fit against opposite sides of the vehicle wall and are drawn toward each other to clamp the wall about the door opening. The door is mounted to the door assembly for opening and closing movement within the frame.

Accordingly, it is an object of this invention to provide a novel and useful door assembly for a vehicle.

Another object of this invention is to provide a door assembly which may be quickly and easily installed in a vehicle wall opening.

Another object of this invention is to provide a door assembly which includes a frame formed into sections for mounting of the assembly into a vehicle wall opening.

Another object of this invention is to provide a door assembly which includes a door having a circumferential frame and an upper cross brace, a channel formed in the frame and the upper cross brace, and an outer door panel which fits at its periphery into the channel.

Another object of this invention is to provide a door assembly having a mounting frame formed into inner and outer sections where each section carries a seal for sealing contact with the vehicle wall.

Another object of this invention is to provide a door assembly which includes a door having inner shields to prevent moisture from entering the vehicle.

Other objects of this invention will become apparent upon a reading of the following description.

DESCRIPTION OF THE PREFERRED EMBODIMENT

Figure 1:
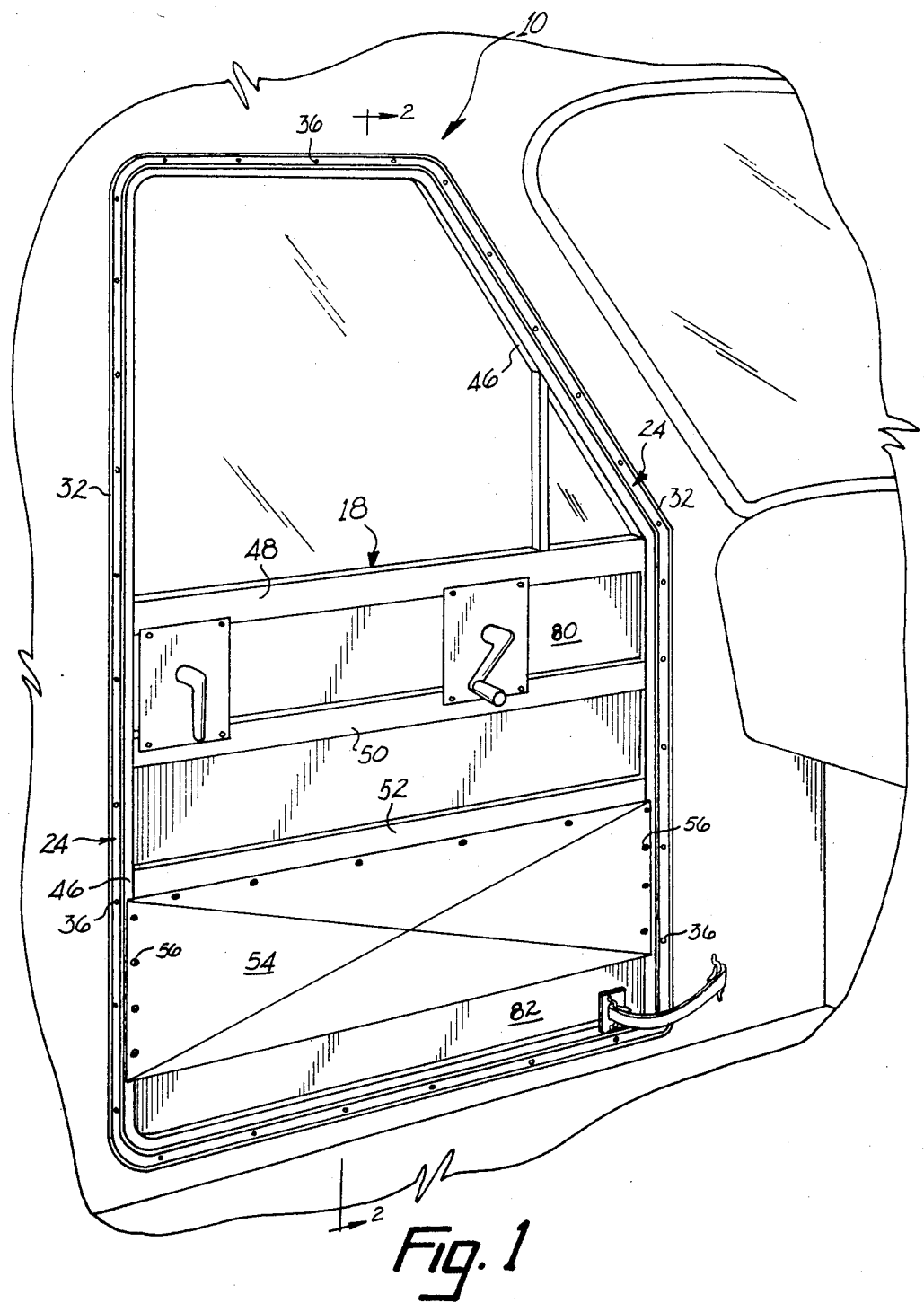
FIG. 1 is a perspective view of the door assembly mounted in a vehicle wall opening.

The preferred embodiment illustrated is not intended to be exhaustive or to limit the invention to the precise form shown. It is chosen and described in order to explain the principles of the invention and its application and practical use to thereby enable others skilled in the art to utilize the invention.

The door assembly 10 of this invention includes a frame 12 which is used to mount the door assembly in an opening 14 in a vehicle wall 16. Door assembly 10 also includes a door 18 mounted by hinge 20 to frame 12. Door assembly frame 12 is divided into two sections, namely, a mounting outer section 22 and a retainer inner section 24. Frame sections 22 and 24 each includes a flange 26,28, respectively, which terminates in an inturned T-shaped portion 30. A seal 32 is mounted to each frame section T-shaped portion 30 and is continuous about each of mounting outer section 22 and retainer inner section 24. Mounting outer section 22 includes an inturned body portion 23 which fits across vehicle wall 16 at the periphery of opening 14. Body portion 23 includes an offset shoulder portion 78 which abuts a door seal 74 as described below. Shoulder portion 78 has spaced threaded bores 38 formed in its inner face.

The mounting of door assembly 10 to vehicle wall opening 14 is accomplished by placing mounting outer section 22 within the vehicle wall opening and positioning it with the aid of spacers 34. Retainer inner section 24 is then applied to the opposite side of vehicle wall 16 such that its seal 32 is snug against the vehicle wall. Threaded fasteners, such as screws 36, are then turned through retainer inner section 24 and into outer section bores 38 to clamp vehicle wall 16 between seals 32. Door stops 40 may be secured to retainer ring section 24 at the top and bottom of vehicle wall opening 14, as shown in FIG. 2, by a screw 36 to prevent door 18 from traveling beyond its closed position.

Figure 2:
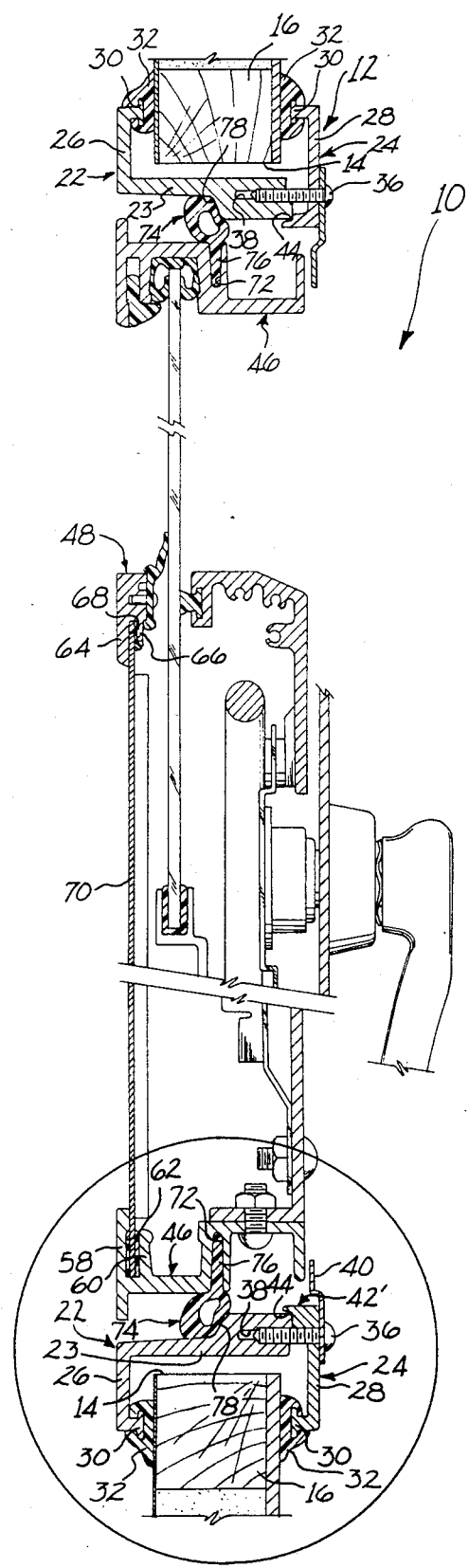
FIG. 2 is a vertical fragmentary sectional view taken along line 2—2 of FIG. 1.
Figure 3:
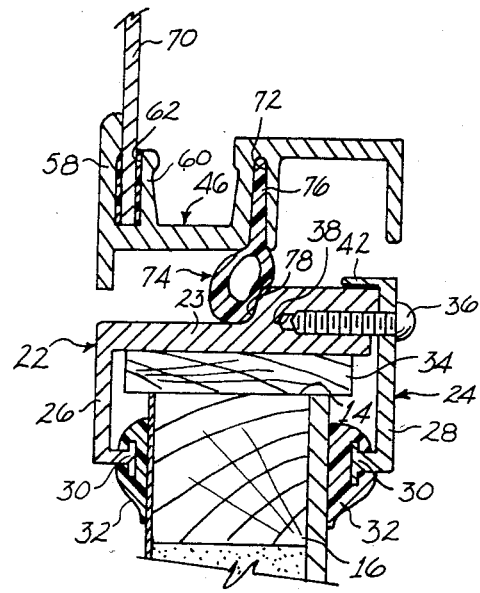
FIG. 3 is an exploded view of the circled portion of FIG. 2 showing the mounting frame of the door assembly and a second frame inner section adapted to a second vehicle wall thickness.
Figure 4:
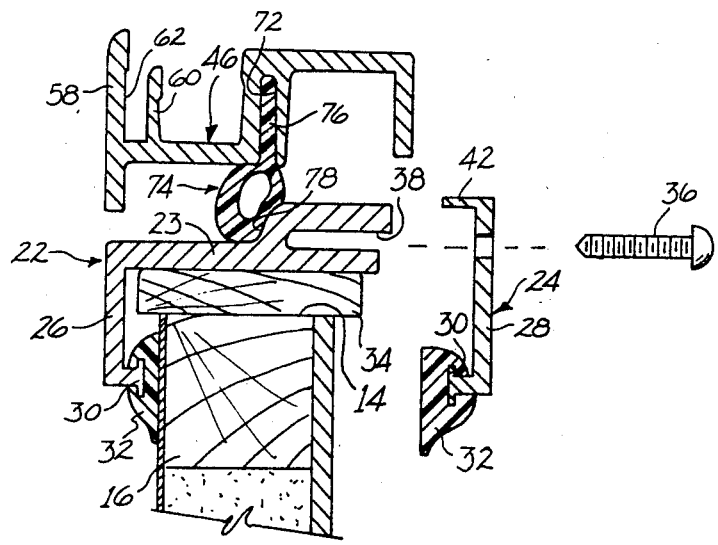
FIG. 4 is a view like FIG. 3 showing the door assembly frame with the inner section thereof in exploded form.
Figure 5:
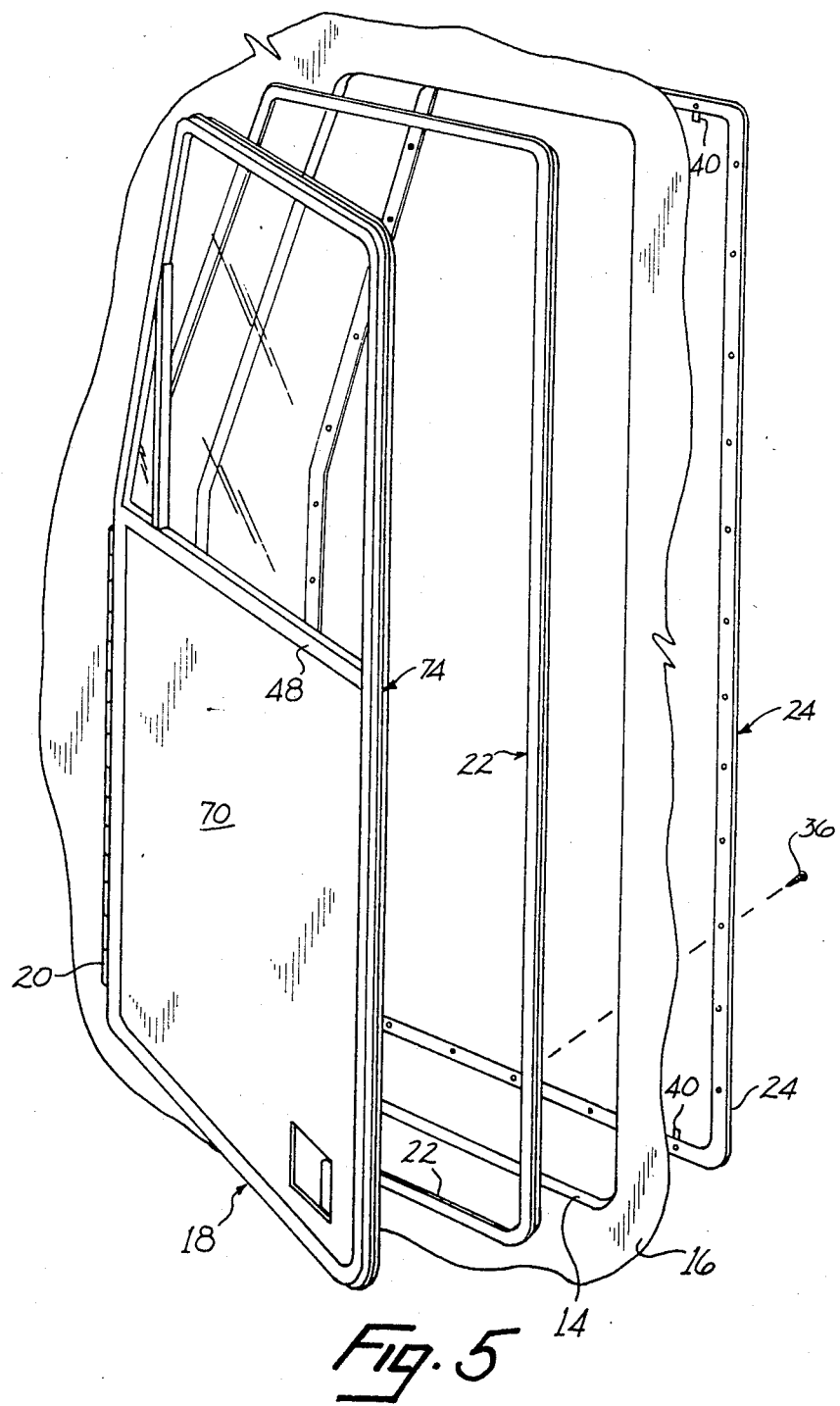
FIG. 5 is an exploded perspective view of the door assembly.

Retainer inner section 24 may be made in two different configurations, as shown in FIGS. 2, 3, and 4, to provide for mounting of door assembly 10 in vehicles having different wall thicknesses. In one configuration of retainer inner section 24, as shown in FIGS. 3 and 4, the retainer inner section has an inturned flange 42 at a side opposite to T-shaped portion 30. Inturned flange 42 has a smooth surface and permits seating of retainer inner section 24 against mounting frame section 22 at its raised shoulder portion 78. A second configuration of retainer inner section 24, shown in FIG. 2, includes an inturned flange 42', which has a stepped shoulder 44 formed therein which seats against mounting frame section 22 at its raised shoulder portion 78. With this configuration of retainer inner section 24, the retainer inner section is spaced from mounting frame section 22 when the two sections are assembled, thus permitting installation of door assembly 10 in a vehicle wall 16 of greater thickness.

Door 18 preferably includes an outer circumferential frame 46. Door frame 46 is rigidified by an upper cross brace 48, a first inner lower cross brace 50, and a second inner lower cross brace 52, as shown in FIG. 1. An inner reinforcement panel 54 is connected, such as by screws 56, to door frame 46 and inner lower cross brace 52. Door frame 46 has at its outer edge an inturned flange 58 and spaced therefrom a second inturned flange 60 to form a channel 62. Upper cross brace 48 similarly has an outer inturned flange 64 and a second inturned flange 66 spaced from the outer inturned flange to form a channel 68. An outer door panel 70 fits at its peripheral edges into door frame channel 62 and upper cross brace channel 68, and is retained therein such as by welding. Door frame 46 has formed therein about its outer circumference a narrow groove 72. A door seal 74 having a protrusion 76 which fits into door groove 72 in an interference fit extends continuously about door frame 46. Seal 74 abuts shoulder 78 formed in mounting outer section 22 when door 18 is in its closed position. Seal 74 is removable from groove 72 and may be replaced by a seal of similar construction. A shield 80 is suspended from upper cross brace 48 to the second inner lower cross brace 52. A second shield 82 is suspended from reinforcement panel 54 to the bottom of door frame 46. Shields 80, 82 retain moisture within door 18 and prevent it from entering the vehicle.

It should be understood that the invention is not to be limited by the terms of the above description, but may be modified within the scope of the appended claims.

I claim:

1. A door assembly for installation in a vehicle, said vehicle including a wall, said wall having an opening formed therein, said door assembly including a frame, hinge means for supporting a door in said frame, the improvement wherein said door frame includes first and second sections, each first and second door frame section having a flange, said first door frame section fitting into said vehicle wall opening with its said flange abutting one side of the vehicle wall, said second door frame section confronting said first door frame section at said wall opening with its said flange abutting the other side of said vehicle wall, said first door frame section being connected to said second door frame section to compress said vehicle wall therebetween, and said door includes an outer circumferential frame, an upper cross brace connected to said circumferential frame, a first flange at an outer edge of said circumferential frame and said upper cross brace, and a second flange at along said circumferential frame and upper cross brace spaced from and adjacent to said first flange to form a channel, and an outer door panel fitted at its peripheral edges into said channel.

2. The door frame assembly of claim 1 wherein said first frame section includes a body section extending from said flange and spanning the periphery of said wall opening, said second frame section including an inturned member which overlies an inner margin of said first frame section body section, said first frame section body section seated against said second frame section flange when said wall is compressed between said first and second frame sections to prevent movement of said first frame section toward said second frame section.

3. The door frame assembly of claim 2 wherein said second frame section inturned member includes a step portion, said step portion abutting said first frame section body section when said wall is compressed between said first and second frame sections, whereby said first and second frame sections may compress a wall of greater thickness therebetween.

4. The door assembly of claim 1 wherein said door includes first and second spaced inner lower cross braces, each lower cross brace connected to said circumferential frame, an inner reinforcement panel fastened to said second inner lower cross brace and circumferential frame spaced from said outer panel, a first shield suspended from said upper cross brace to said first inner lower cross brace and a second shield suspended from said reinforcement panel to a lower edge of said door.

5. The door frame assembly of claim 2 wherein said first frame section includes a raised shoulder means and, said second frame section including stop means for abutting said door when said door is in its latched position.

* * * * *